INVENTOR.
David L. Fuller
BY
ATTORNEY

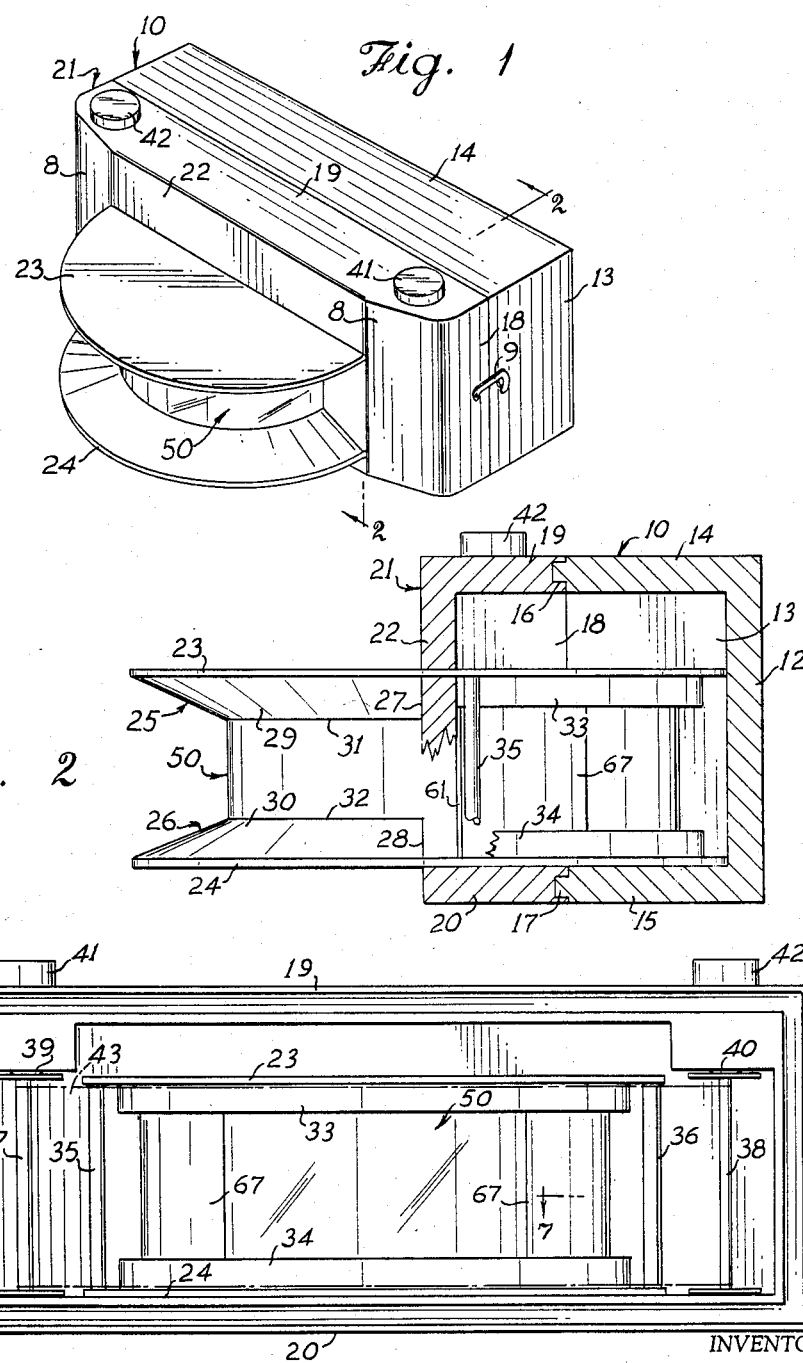
May 17, 1966     D. L. FULLER     3,251,266
WIDE ANGLE OBJECTIVE HAVING NON-SPHERICAL SURFACES
Filed Oct. 4, 1961     3 Sheets-Sheet 1
INVENTOR.
David L. Fuller
BY
ATTORNEY May 17, 1966  D. L. FULLER  3,251,266
WIDE ANGLE OBJECTIVE HAVING NON-SPHERICAL SURFACES
Filed Oct. 4, 1961  3 Sheets-Sheet 2

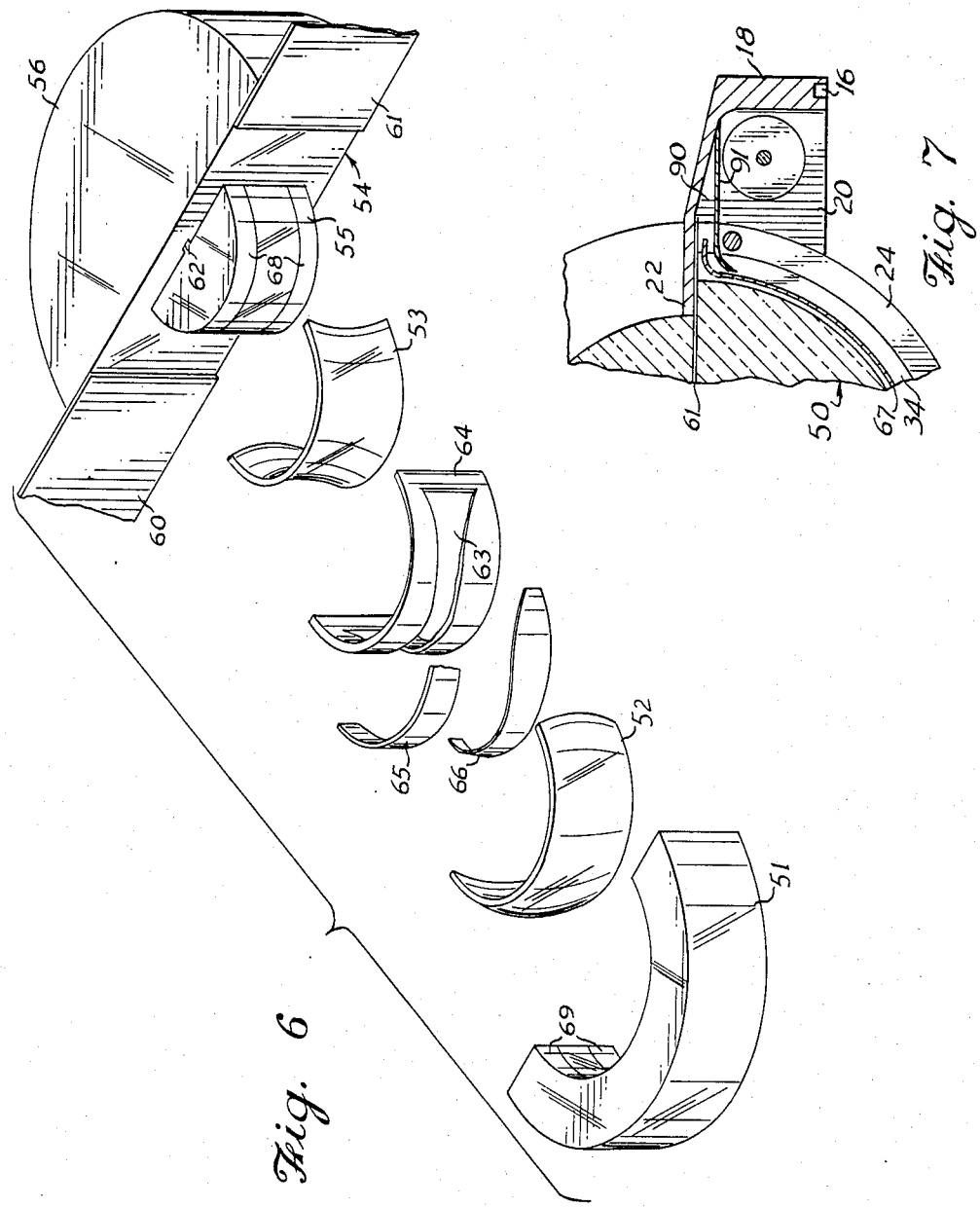

United States Patent Office 3,251,266
Patented May 17, 1966

3,251,266
WIDE ANGLE OBJECTIVE HAVING NON-
SPHERICAL SURFACES
David L. Fuller, 2927 Rockingham Drive NW.,
Atlanta 5, Ga.
Filed Oct. 4, 1961, Ser. No. 142,913
15 Claims. (Cl. 88—57)

This invention relates to optical systems, and is more particularly concerned with a wide angle lens, that is, a lens whose focal length is smaller than the largest dimension across the plate or film used in conjunction with the lens, and a photographic device employing the lens as an objective.

In the past, wide angle lenses have been produced for use as photographic objectives. Such wide angle lenses, however, have not been extensively employed due to their complexity. Such prior art devices, usually require corrective plates and a complicated shutter and stop system to produce a relatively undistorted picture. Thus, such wide angle lenses have not been well accepted.

On the other hand, the wide angle lens photographic device of the present invention is relatively simple and has a double aperture system and a shutter system placed within the optical system. The optical system of the present invention is, in effect the combination of, two different optical systems so superimposed upon each other as to function in perpendicular planes to produce an undistorted, clear image focused onto an arcuate surface carrying the photosensitive element or film. Thus, one of the two optical systems, converges incident light rays in a manner so as to size an image vertically while the other system, the concentric system, completing the objective converges incident light rays in a manner so as to size the image horizontally, the arrangement being such that the locus of foci is essentially arcuate. The various elements which make up the compound lens of the present device are so related that the magnification power vertically and horizontally are the same, thereby creating an image which retains the dimensional proportions of the object which produces that image. In other words, the image produced by the optical system of the present invention is congruent with respect to the object.

Accordingly, it is an object of the present invention to provide a wide angle lens which will produce a sharp well defined image of a wide area without appreciably distorting the image, nor introducing deleterious aberrations.

Another object of the present invention is to provide a photographic device which is inexpensive to manufacture, durable in structure and efficient in operation, the device evenly illuminating a film frame instantaneously so as to produce a good clear, properly dimensioned picture.

Another object of the present invention is to provide, in a photographic device, a wide angle objective lens having a simple and effective shutter and aperture system which may be readily and easily adjusted for proper exposure.

Still another object of the present invention is to provide a wide angle objective lens possessing maximum flexibility of design to permit a wide latitude in the utilizaton of the lens for optical systems.

Other objects, features and advantages of the present invention will become apparent from the following description when taken in conjunction with the accompanying drawings wherein like characters of reference designate corresponding parts throughout the several views and wherein:

FIG. 1 is a perspective view of a photographic camera constructed in accordance with the present invention.

FIG. 2 is a cross sectional view taken along line 2—2 in FIG. 1.

FIG. 3 is a rear elevational view of the camera shown in FIG. 1, the rear section of the camera being removed to show the interior thereof.

FIG. 6 is an exploded perspective view of the lens shutter and aperture systems shown in FIGS. 4 and 5.

FIG. 7 is a cross sectional view taken along the line 7—7 in FIG. 3.

Figure 4:
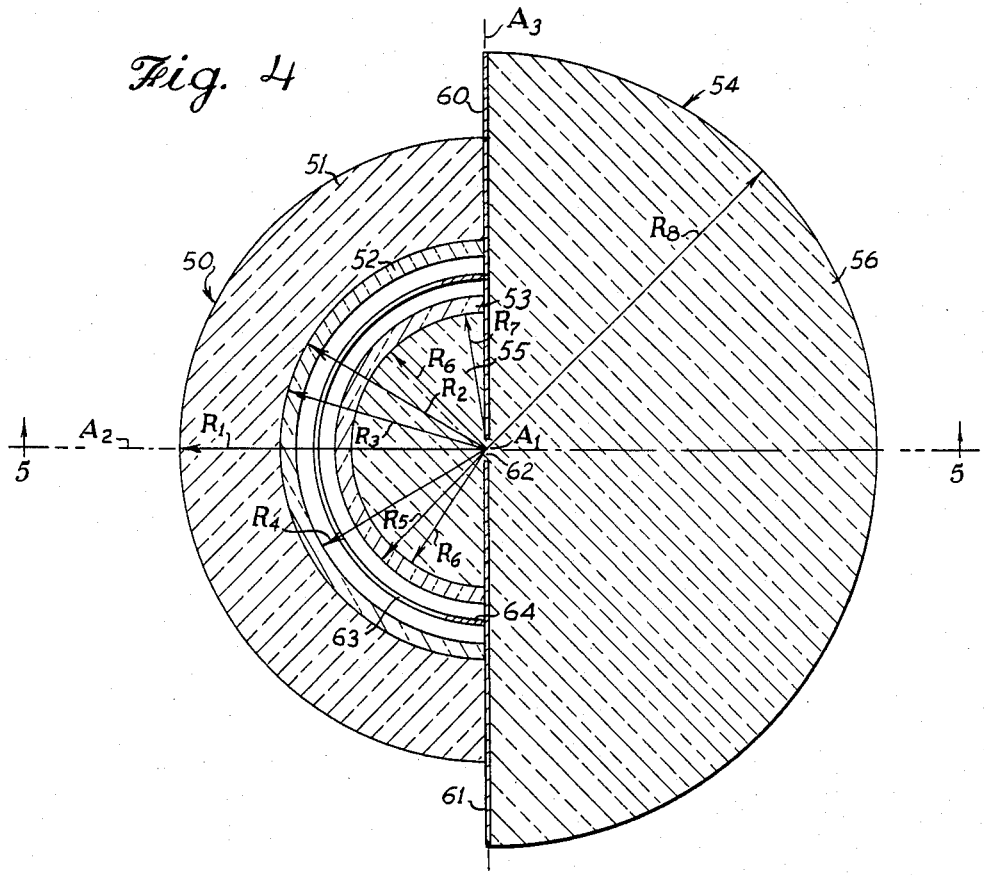
FIG. 4 is an enlarged horizontal sectional view of the lens shutter and aperture systems of the camera shown in FIG. 1.

Referring now in detail to the embodiment chosen for the purpose of illustrating the present invention, it being understood that in its broader aspects, the present invention is not limited to the exact details herein depicted, numeral 10 denotes generally the back member of the casing of the camera. Back member 10 includes a rectangular back wall 12, a pair of forwardly extending side walls 13, a top wall 14 and a bottom wall 15 joined together to form an open-ended box. The forward edge 16 of side wall 13, top wall 14 and the bottom wall 15 terminate in a plane parallel to back wall 12 and are provided with a tongue 17 which is received within a complementary groove at the rear edge of side walls 18, top wall 19 and bottom wall 20 of the front member 21. The arrangement is such that the abutting side walls 13 and 18 lie in opposed parallel vertical planes, and the abutting top walls 14 and 19 are in a horizontal plane parallel to the plane of the bottom walls 15 and 20. The front member 21 includes front 22, the side edges of which merge with the rearwardly diverging side members 8, the edges of side members 8 being connected to the front edges of sides 18.

It is now seen that the casing includes a back member 10 and a front member 21 which abut each other to provide a closure or "dark box," releasably retained together by means of suitable latches, such as latch 9, to define a film cavity. It will be understood, however, that other closures may be substituted for the casing thus far described.

The front wall 22 is provided with a pair of parallel horizontal disk receiving slots, which receive and support complementary, spaced, parallel upper and lower disks 23 and 24. As best seen in FIG. 2, approximately one-half of each of disks 23 and 24 protrudes rearwardly of front wall 22 so as to be within the film cavity. The forward portions of the disks 23 and 24 extend beyond the front wall 22 as best seen in FIG. 1.

Carried by the inner surfaces of the forward portions of disks 23 and 24 are opposed frusto-conically shaped lens supporting members 25 and 26 which conform to the shape of these portions, the members 25 and 26 having flat vertical inner sides 27 and 28 abutting the front wall 22 and converging conical outer surfaces 29 and 30. The opposed inner walls 31 and 32 of the lens supporting members 25 and 26 are parallel to the disks 23 and 24 and parallel to each other for the purpose of receiving and holding a portion of the objective lens, denoted generally by numeral 50.

Within the casing are a pair of flat semi-circularly shaped film guides 33 and 34 secured respectively to the inner surfaces of the disks 23 and 24. Outwardly adjacent the ends of guides 33 and 34 are film guide rods 35 and 36, the ends of the rods 35 and 36 being carried by the disks 23 and 24, as seen in Fig. 3. Guide rods 35 and 36 are thus parallel to and closely adjacent the inner surface of front wall 22 and are free to rotate.

Protruding through the top wall 19 so as to receive and rotate the film spools 37 and 38 are a pair of conventional spindles 39 and 40. Knurled rollers 41 and 42 connect to the spindles 39 and 40 and serve as a means of rotating spindles 39 and 40.

In FIG. 3 it will be seen that the film carrying spool 37 is located outwardly adjacent guide rod 35 while the windup spool 38 is outwardly adjacent guide rod 36. Therefore, the film 43, indicated by the broken lines in FIG. 3, is installed within the casing by being passed from spool 37, beneath rod 35, over the arcuate surfaces of film guides 33 and 34, and beneath guide rod 36 to spool 38. It will be understood by those skilled in the art that since the disks 23 and 24 protrude beyond the arcuate edges of guides 33 and 34, the disks 23 and 24 limit the upward and downward movement of the film 42 so as to maintain the film 43 in its proper position on the guides 33 and 34, whereby the central portion of the film is supported in an arcuate condition between the guides 33 and 34.

According to the present invention, the lens 50 is made up of a plurality of concentric lenses having a common vertically disposed axis of revolution $A_1$, a common lens or optical axis $A_2$ and a common center C formed at the point where the axes $A_1$ and $A_2$ meet. In more detail, the lens 50 includes an outer or front lens 51, a pair of intermediate lenses 52 and 53 and an inner or rear lens 54.

The front lens 51 is annular and the intermediate lenses 52 and 53 are each toric, while the rear lens 54 is an integrally formed member having abutting, forwardly and rearwardly protruding disk segments 55 and 56.

As the concentric system is viewed in FIG. 4, i.e., as a horizontal section passing through the lens center line or axis $A_2$, the outer surface of the front lens 51 has a radius $R_1$ while the inner surface has a smaller radius $R_2$. Further, the outer intermediate lens 52 has radius $R_3$ for its outer surface, the radius $R_3$ being essentially equal to the radius $R_2$. The radius $R_4$ of the inner surface of the outer intermediate lens 52 is smaller than $R_3$. The inner intermediate lens 53 has radius $R_5$ for its outer surface and the radius $R_6$ for its inner surface. The rear lens 54 has radius $R_7$ for its front surface and $R_8$ for its rear surface.

Figure 5:
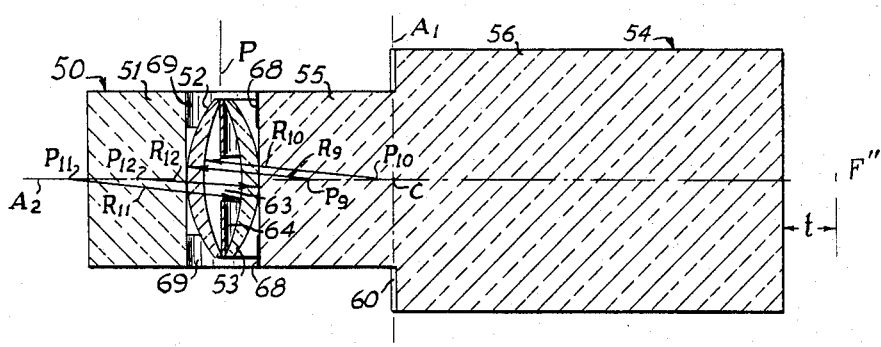
FIG. 5 is a cross sectional view taken along line 5—5 in FIG. 4.

As the axial system is viewed in FIG. 5, i.e. the system along any plane coincident with the axis of rotation $A_1$, the front lens 51 is essentially a rectangle having essentially no curvature for the parallel front and back surfaces. Thus it is seen that the lens 51 has a front cylindrical surface that is concentric about $A_1$ and a rear cylindrical surface that is likewise concentric about $A_1$. In cross section, as seen in FIG. 5, the intermediate lenses 52 and 53 appear as opposed menisci whereby the outer convex surface of lens 52, as generated vertically by radius $R_9$, approaches upwardly and downwardly at its extremities the inner concaved surface of lens 52 as generated vertically by radius $R_{10}$. Similarly, the outer concaved surface of lens 53, as generated vertically by radius $R_{11}$, approaches upwardly and downwardly at its extremities the inner surface of lens 53 as generated by radius $R_{12}$. From an examination of FIG. 5, it will be seen that lens 54 is essentially two rectangular, juxtaposed members in cross section.

It will be observed that all of the radii, $R_1$ through $R_8$, emanate from the axis of revolution $A_1$. The radii $R_9$ through $R_{12}$ emanate from various points $P_9$, $P_{10}$, $P_{11}$ and $P_{12}$ along the lens axis $A_2$ as shown in FIG. 5 and are generated in vertical planes from arcs that are described about the axis of revolution $A_1$ passing through said points.

A better understanding of the lens 50 of the present invention will be had by reference to the following Table I which establishes values for a single embodiment of a lens employing the inventive concept of the present invention.

TABLE I
*Objective lens*

| Lens | Refractive Index | Radius, Units of Length |
|---|---|---|
| Outer lens 51 | 1.4886 | $R_1$=7.1089<br>$R_2$=4.8066 |
| Outer intermediate lens 52 | 1.4866 | $R_3$=4.8066<br>$R_4$=4.8066 |
| Inner intermediate lens 53 | 1.4886 | $R_5$=3.5066<br>$R_6$=3.1066 |
| Inner lens 54<br>Outer lens segment 55<br>Inner lens segment 56<br>Focal length=9.8445. | 1.4886 | $R_7$=3.1066<br>$R_8$=9.0445 |

As best seen in FIG. 4, in the manufacture of lens 54, a pair of vertical slits are cut therein from opposite sides along the transverse center line $A_3$ toward the axis of rotation $A_1$ so as to terminate within a short distance of the axis $A_1$. Opaque sheets 60 and 61 are received within the slits to form a pair of diametrically opposed stops, the inner edges of which define a vertical slot or primary aperture 62 in the lens 54 through which all light passes. It will be understood by those skilled in the art that in the design of the lens 54, the predetermined aperture defined by sheets 60 and 61 may be varied as found desirable.

A second aperture 63 is established between the intermediate lens 52 and 53. This secondary aperture is formed as an arcuate horizontally disposed slot in an arcuate sheet 64 inserted between the lenses 52 and 53 as shown in FIG. 4. It will be observed in FIG. 6 that the upper and lower edges of sheet 64 which define the slot are curved respectively downwardly and upwardly, being essentially arcuate, whereby the central portion of the aperture 63 is substantially more narrow than the end portions thereof. Thus, more light emanating at the sides of lens 50 will be transmitted through aperture 63 than light from an object directly in front of the lens 50. The effect of the secondary aperture is to provide uniform illumination of the film since light passing at an angle with respect to axis $A_2$ in the horizontal plane through aperture 62 has a smaller width to traverse than light passing along the optical axis $A_2$.

While it will be understood by those skilled in the art that various shutters may be incorporated in the camera thus far described, including focal plane shutters and between-the-lens shutters, or, indeed, both, as found in some prior art devices. I have found, however, that a between-the-lens shutter is well suited to the present device. The shutter presently disclosed includes a pair of overlapping, arcuate, thin metal plates 65 and 66 arranged in front of the secondary stop or sheet 64 and between intermediate lenses 52 and 53. One or both of these thin metal sheets 65 or 66 may be moved away from the other in a well known fashion so as to expose temporarily the film 43 within the film cavity.

For best results, it is desirable to provide a variable opaque frame width controller, positioned between the film and the back surface of the lens 54. Preferably, the controller includes plates 67 which are a pair of thin flexible rectangular sheets of metal slideably received within opposed arcuate grooves in guides 33 and 34 and defining a central open therebetween. The ends of the plate 67 curve outwardly and are received in recesses, such as recess 90 in FIG. 7. The recess 90 is formed by a hollow portion of the front wall 22 enclosed by a plate 91.

Thus, it will be seen that the plates 67 may be slid in grooves 33 and 34 to vary the size of the opening therebetween and thereby vary the arc of the field to be photographed.

I have found it highly desirable to incorporate in the device herein disclosed a series of opaque masks 68 and 69, the sole function of which is to reduce greatly the possibility of internal reflection within the lens 50. Referring now to FIGS. 5 and 6, these masks 68 and 69 are most usefully positioned on the rear surface of lens 51 and on the front surface of lens 55, extending from the opposite inner walls 31 and 32 of the lens supporting members 25 and 26 toward a plane described by the axes $A_2$ and $A_3$ so as to terminate, at all points, the same short distance from said plane. These masks 68 and 69 comprise thin arcuate bands which are cemented or painted on the surface of lenses 51 and 55 for blocking any light rays that could, upon passage through the lens 50, focus above or below the upper or lower limit of the film 43. Thus it is seen that with the present arrangement, it would be impossible for a light ray to enter the lens 50 and by reflection be directed onto the film 43.

It will be observed in FIG. 4 that the various lenses are symmetrical along the optical axis $A_2$ as well as being concentric, having a common axis of rotation $A_1$. Preferably, the outer lens 51 is smaller in diameter than the rear segment 56 of rear lens 54, with the lenses 51, 52 and segment 55 being progressively smaller in diameter. Thus, each lens nests within the next most forward lens. All upper non-optical surfaces of the lenses 51, 52, 53 and segment 55 are in parallel planes parallel and symmetrical to the planes of all lower non-optical surfaces thereof. Glue, adhesive, bolts or other means of fastening (not shown) is employed to secure these surfaces to the inner walls 31 and 32 of the lens supporting members 25 and 26. In a similar manner, the upper and lower flat parallel surfaces of segment 56 are adhered to the inner surfaces of the rearwardly protruding portions of discs 23 and 24, the rear lens 54 being thicker at segment 56 than at segment 55.

Since the camera described is operated in essentially the same manner as conventional cameras, it is deemed obvious to advance the film 43 by at least one frame after each exposure. I have found that approximately a 140° lateral area may be photographed with ease employing the camera hereinbefore described. In extreme cases, as much as 160° of lateral area may be photographed, if desired.

The theory on which the present lens 50 was designed is that the outer lens 51 converges the horizontal light bands while within said lens having essentially unaffected the vertical light bands, directing the light toward the axis of rotation $A_1$, which coincides with the second principal point of both systems. Thence, the light traverses the lens 52 and 53 which further converge the light both horizontally and vertically, directing the same to the front lens segment 55 of the rear lens 54 where the horizontal light is further converged with all the light passing through the aperture 62. The function of the rear section 56 is to space the vertical light bands rearwardly so as to bring into coincidence the foci of the two systems and to direct the light to an arcuate focus along the film 43.

It will be understood by those skilled in the art that the design of lens 50, as a specific embodiment, centers upon the selection of the lens segments generally denoted by numerals 52 and 53. More generally, I have found that any number of well known photographic objectives may be placed as a two dimensional section between the lenses 51 and 54 and thereby generated as toric elements, e.g., the cross section of a Cooke triplet type of photographic objective could easily replace the lenses 52 and 53 in my embodiment and, by applying the method to be described below, I can compute the dimensions of a lens with perhaps different characteristics of imagery but still composed of the same basic parts which all perform similar functions. In the discussion below, the same combination as existent in the present embodiment will be analyzed.

In selecting the radii for the meniscus lenses 52 and 53, it is desirable to have the air gaps between the two lenses 52 and 53 as small as possible while still providing sufficient space therebetween for the shutter plates 65 and 66 and the secondary stop 64.

It will be remembered that it was necessary to interpose between the inner surface of the lens 53 and the focal point "F" in FIG. 5 a solid transparent medium such as glass or plastic in the form of lens 54 such that the focal point "F" of the converging lenses 52 and 53, by the addition of the glass or plastic lens 54, is moved to some short distance $t$ in FIG. 5 behind the rear surface of lens 54. It is desirable, however, to provide sufficient distance $t$ between the film and the rear surface of lens 54 so that any dust or small scratches will not be projected onto the film.

The determination of radii $R_3$, $R_4$, $R_5$, $R_6$, $R_7$ and $R_8$ is, therefore, associated with the lenses 52, 53 and the lens 54. The second principal point of the lenses 52, 53 and 54 is first computed in the usual manner. It should now be observed that the location of this second principal point coincides with the axis of rotation $A_1$. Referring now to FIG. 4, it will be understood that, in any concentric optical system such as the present system, any deplorement of radii, as long as these radii emanate from the same point, results in the second principal point being located at the center of the array. Hence I have generated the radii for lenses 52, 53 and 54, namely, radii $R_3$, $R_4$, $R_5$, $R_6$, $R_7$ and $R_8$ from the second principal point of the concentric system which is also coincident with axis $A_1$.

Nothing has been said thus far about the function of front lens 51. First, let us qualitatively analyze the results so far:

(1) The combination of intermediate lenses 52 and 53 plus the parallel-plane lens 54 will focus some distance behind the rear surface of lens segment 56.

(2) The concentric system of FIG. 4 minus the lens 51 has been generated. The focal length, thereof, has not been investigated.

It is necessary for the focal length of the concentric system to coincide essentially with that of the system, lenses 52 and 53, and lens 54, so as to bring the focal points of the two systems together. It should be remembered that any annular lens 51 added, which is concentric with the other lenses of the system, will not change the location of the second principal point of the concentric system of FIG. 4.

Since radius $R_7$ is relatively small, the focal length of the concentric system is considerably shorter than the focal length of the combination of lenses 52, 53 and 54. Therefore it is necessary to lengthen the focal length of the concentric combination of these same lenses 52, 53 and 54 while leaving essentially unaffected the focal length of the axial combination. This is accomplished by adding the annular front lens 51.

The inner surface of lens 51 is placed essentially against the front surface of lens 52 since it is desirable to have as little air space as possible therebetween. The outer radius $R_1$ of lens 51 is dictated by the focal length which must be attained in the concentric system so that it matches the focal length of the axial system. The annular lens 51, however, does not appreciably affect the combination of lenses 52, 53 and 54 as viewed in FIG. 5 at the object distances which are being used (near infinity).

If desired, the back surface of the lens segment 56 particularly adjacent the upper and lower edges may be made slightly concaved to provide a plano-concave lens segment. The major effect of this slight concavity of the back surface of the lens segment 56 is to reshape the focal surface of the concentric system.

The lens combination thus far described has many corrective features inherent in the system. In designing lenses according to the present inventive concept, the following should be kept in mind:

In the concentric system, as viewed in FIG. 4, spherical aberration is controlled by making $R_8$ as large as possible while making $R_1$ as small as possible, keeping in mind that fact that all air gaps should be as small as possible. Effective control is also had by properly choosing the width of the primary stop so as to utilize selectively the most accurate rays coming through the concentric system.

Spherical aberration in the axial system, as viewed in FIG. 5, is a more pronounced problem. The good solution is to aspherize the surfaces of 52 and 53 so as to make spherical aberration very small. Again, effective use of the secondary stop provides a suitable control of spherical aberration.

Because of the inherent symmetry of design present in the concentric and axial combinations, lateral color and coma are largely cancelled out for the object distances involved.

Longitudinal color is not specifically corrected for in either system; however, it is minimized by using glasses or plastics which have low dispersions.

In the present objective system there are two focal surfaces: one described by the concentric system, viewed in FIG. 4, and the other described by the axial system, viewed in FIG. 5. Since the difference between these two surfaces anywhere in the field is a measure of the astigmatism in the lens, it is here that I can achieve a result with the lens of the present invention which cannot be achieved, to the best of my knowledge, with any prior art lens; i.e., I can move one focal surface without disturbing the other, simply by increasing or decreasing radius $R_1$. Thus, I can achieve the least amount of astigmatism with the flattest possible vertical curvature.

It will be obvious to those skilled in the art that many variations may be made in the embodiment chosen for the purpose of illustrating the present invention without departing from the scope thereof as defined by the appended claims.

I claim:

1. An optical objective comprising a system of lenses that have at least half of the optical surfaces thereof formed as nonspherical surfaces, each of said optical surfaces being aligned on a common optical axis and having an arc thereon that intersects said optical axis and is concentric about a common central axis that is perpendicular to said common optical axis, said non-spherical surfaces being disposed so that on opposite sides of said common central axis there is at least one non-spherical surface, said objective system producing an arcuate image to the rear of the system that is concentric about said common central axis.

2. An optical objective comprising a system of lenses having at least half of the optical surfaces formed as non-spherical surfaces, each of said optical surfaces being alinged on a common optical axis and having an arc thereon that intersects said optical axis and is concentric about a common central axis that is perpendicular to said common optical axis, said non-spherical surfaces being disposed so that on opposite sides of said common central axis there is at least one non-spherical surface, a first aperture defining a slot extending in parallel alignment with said common central axis, and a second aperture defining a slot extending substantially normal to said first aperture and being displaced from and concentric about said common central axis, said objective system forming an image to the rear of the system.

3. An optical objective comprising a system of lenses having at least half of the optical surfaces thereof formed as non-spherical surfaces, each of said optical surfaces being aligned on a common optical axis and having an arc thereon that intersects said optical axis and is concentric about a common central axis that is perpendicular to said common optical axis, said non-spherical surfaces being disposed so that on opposite sides of said common central axis there is at least one non-spherical surface, a first aperture defining a slot extending in parallel alignment with said common central axis, a second aperture defining a slot extending substantially normal to said first aperture and being displaced from and concentric about said common central axis, and a shutter mechanism disposed adjacent said second aperture, said shutter and said second aperture arrangement permitting the passage of more light at the extremities of said second aperture than at the center thereof, said objective system forming an image to the rear of the system.

4. An optical objective comprising a system of lenses that have at least half of the optical surfaces formed as non-spherical surfaces, each of said optical surfaces being aligned on a common optical axis and having an arc thereon that intersects said optical axis and is concentric about a common central axis that is perpendicular to said common optical axis, said non-spherical surfaces being disposed so that on opposite sides of said common central axis there is at least one non-spherical surface, said objective system forming an image to the rear of the system.

5. An optical objective as defined in claim 4 including a first aperture member defining a slot extending in the direction of the common central axis.

6. An optical objective as defined in claim 5 including a second aperture member defining a slot extending substantially normal to said first aperture and displaced from and concentric about the common central axis.

7. An optical objective as defined in claim 6 and further characterized in that said second aperture slot is wider at its extremities than at its center.

8. An optical objective as defined in claim 6 including a shutter mechanism disposed adjacent said second aperture.

9. An optical objective as defined in claim 8 and further characterized in that said shutter and said second aperture arrangement permit the passage of more light at the extremities of said second aperture than at the center thereof.

10. An optical objective as defined in claim 9 including a film support means disposed about the common central axis outwardly of the rear optical surface.

11. An optical objective as defined in claim 10 including an adjustable frame width control means disposed between said rear optical surface and said film support means.

12. An optical objective, comprising a system of lenses that have at least half of the optical surfaces thereof formed as non-spherical surfaces, each of said optical surfaces being aligned on a common optical axis and having a first radius of curvature intersecting said common optical axis, said first radius of curvature being concentric about a common central axis that is perpendicular to said common optical axis, each non-spherical surface having a second radius of curvature in the plane containing both the common optical axis and common central axis that intersects said first radius of curvature, said second radius of curvature being different from said first radius of curvature, said non-spherical surfaces being disposed so that on opposite sides of said common central axis there is at least one non-spherical surface, said objective system forming an image to the rear of the system.

13. An optical objective, comprising a system of lenses that have at least half of the optical surfaces thereof formed as non-spherical surfaces, each of said optical surfaces being aligned on a common optical axis, and having a first radius of curvature intersecting said common optical axis, said first radius of curvature being concentric about a common central axis that is perpendicular to said common optical axis, each non-spherical surface having a second radius of curvature in the plane containing both the common optical axis and common central axis that intersects said first radius of curvature, said second radius of curvature being different from said first radius of curvature, said non-spherical surfaces being disposed so that on opposite sides of said common central axis there is at least one non-spherical surface, a first aperture defining a slot extending in parallel alignment with said common central axis, and a second aperture defining a slot extending substantially normal to said first aperture and being displaced from and concentric about said common central axis, said objective system forming an image to the rear of the system.

14. An optical objective, comprising a system of lenses that have at least half of the optical surfaces thereof formed as non-spherical surfaces, each of said optical surfaces being aligned on a common optical axis, and having a first radius of curvature intersecting said common optical axis, said first radius of curvature being concentric about a common central axis that is perpendicular to said common optical axis, each non-spherical surface having a second radius of curvature in the plane containing both the common optical axis and the common central axis that intersects said first radius of curvature, said second radius of curvature being different from said first radius of curvature, said non-spherical surfaces being disposed so that on opposite sides of said common central axis there is at least one non-spherical surface, a first aperture defining a slot extending in parallel alignment with said common central axis, and a second aperture defining a slot extending substantially normal to said first aperture and being displaced from and concentric about said common central axis, and a shutter mechanism disposed adjacent said second aperture arrangement permitting the passage of more light at the extremities of said second aperture than at the center thereof, said objective system forming an image to the rear of the system.

15. An optical objective, comprising a system of lenses that have at least half of the optical surfaces thereof formed as non-spherical surfaces, each of said optical surfaces being aligned on a common optical axis and having a first radius of curvature intersecting said common optical axis, said first radius of curvature being concentric about a common central axis that is perpendicular to said common optical axis, each non-spherical surface having a second radius of curvature in the plane containing both the common optical axis and the common central axis that intersects said first radius of curvature, said second radius of curvature being different from said first radius of curvature, said non-spherical surfaces being disposed so that on opposite sides of said common central axis there is at least one non-spherical surface, said objective system forming a substantially cylindrical image that is concentric about the common central axis.

References Cited by the Examiner

UNITED STATES PATENTS

| | | |
|---|---|---|
| 2,604,012 | 7/1952 | Taylor. |
| 2,923,220 | 2/1960 | Bouwers. |
| 3,151,524 | 10/1964 | Bouwers _____ 88—57 |

FOREIGN PATENTS

| | | |
|---|---|---|
| 283,493 | 2/1914 | Germany. |

DAVID H. RUBIN, *Primary Examiner.*

EMIL G. ANDERSON, JEWELL H. PEDERSEN,
*Examiners.*